(12) United States Patent
Konagaya et al.

(10) Patent No.: US 8,632,288 B2
(45) Date of Patent: Jan. 21, 2014

(54) ANTI CROSS-THREAD BOLT

(75) Inventors: Satoshi Konagaya, Kani (JP);
Sadayoshi Hasegawa, Inazawa (JP)

(73) Assignee: Aoyama Seisakusho Co., Ltd.,
Niwa-Gun (JP)

( * ) Notice: Subject to any disclaimer, the term of this patent is extended or adjusted under 35 U.S.C. 154(b) by 273 days.

(21) Appl. No.: 13/121,233

(22) PCT Filed: Sep. 30, 2009

(86) PCT No.: PCT/JP2009/005022
§ 371 (c)(1),
(2), (4) Date: Mar. 28, 2011

(87) PCT Pub. No.: WO2010/038446
PCT Pub. Date: Apr. 8, 2010

(65) Prior Publication Data
US 2011/0200410 A1 Aug. 18, 2011

(30) Foreign Application Priority Data

Oct. 2, 2008 (JP) ................................ 2008-256976

(51) Int. Cl.
*F16B 25/00* (2006.01)
(52) U.S. Cl.
USPC ........................ 411/386; 411/411; 411/412
(58) Field of Classification Search
USPC ................. 411/386, 394, 411, 412, 426, 424
See application file for complete search history.

(56) References Cited

U.S. PATENT DOCUMENTS

| | | | | |
|---|---|---|---|---|
| 3,352,190 A * | 11/1967 | Carlson | ...................... | 411/403 |
| 3,978,760 A * | 9/1976 | Muenchinger | ............... | 411/386 |
| 4,952,110 A * | 8/1990 | Avgoustis et al. | ............ | 411/386 |
| 5,609,455 A * | 3/1997 | McKewan | ...................... | 411/386 |
| 5,730,566 A * | 3/1998 | Goodwin et al. | ............ | 411/386 |
| 5,997,231 A * | 12/1999 | Goodwin et al. | ............ | 411/386 |
| 6,077,013 A * | 6/2000 | Yamamoto et al. | ........... | 411/386 |
| 6,120,227 A | 9/2000 | Murase et al. | | |
| 6,261,040 B1 * | 7/2001 | Reynolds et al. | ............. | 411/416 |
| 6,796,761 B2 * | 9/2004 | Mizuno et al. | ................ | 411/386 |
| 6,908,270 B1 | 6/2005 | Iwata | | |
| 7,866,930 B2 | 1/2011 | Murase et al. | | |
| 2002/0076302 A1 | 6/2002 | Garver | | |
| 2003/0059275 A1 * | 3/2003 | Mizuno et al. | ................ | 411/386 |
| 2005/0191152 A1 | 9/2005 | Iwata | | |

FOREIGN PATENT DOCUMENTS

| | | |
|---|---|---|
| JP | 10-141343 A1 | 5/1998 |
| JP | 2001-082430 A1 | 3/2001 |
| JP | 3336257 B2 | 10/2002 |
| WO | 2006/134626 A1 | 12/2006 |

OTHER PUBLICATIONS

Japanese Office Action dated May 17, 2013.

* cited by examiner

*Primary Examiner* — Roberta Delisle
(74) *Attorney, Agent, or Firm* — Burr & Brown, PLLC

(57) ABSTRACT

An anti cross-thread bolt which prevents the bolt from being cross-threaded without the need for correcting its posture by a pilot portion. The bolt is screwed into a female screw having a nominal diameter D and an inner diameter $D_1$. At the tip of a regular thread part formed on the bolt shank, a small-diameter thread part is formed by one pitch or more, the small-diameter thread part having an outer diameter d which is larger than an inner diameter D of the female screw and smaller than $(D+D_1)/2$. When the bolt is obliquely screwed into the female screw, the small-diameter thread part is brought into contact with the female screw at one point, but the bolt is allowed to rotate around the point. Thus, the occurrence of cross-threading is prevented.

5 Claims, 4 Drawing Sheets

ANTI CROSS-THREAD BOLT

BACKGROUND OF THE INVENTION

1. Field of the Invention

The present invention relates to an anti cross-thread bolt which prevents itself from being cross-threaded even when obliquely screwed into a female screw.

2. Description of Related Art

When a bolt is screwed into a nut or any other female screw, it is preferable to insert the bolt by precisely aligning the bolt axis with the female screw axis. In actual assembly lines or the like, however, there are some cases where bolts are inserted using tools such as power screwdrivers with their axes being somewhat inclined. In such cases, the threads of the bolt male screw part fit into the root parts of the female screw that are deviated by one pitch from the proper root parts, and if the bolt is forcibly screwed into the female screw in this state, cross-threading may occur, leading to a serious trouble that the bolt cannot be unscrewed easily.

Conventionally, there have been various kinds of bolts proposed to prevent cross-threading, even if they are inserted into female screws somewhat obliquely. An example of such a bolt is the one disclosed in Patent Citation 1 by the applicant of this invention, where a pilot portion (which is also called a full dog point or a guide portion) is formed at the tip of the regular thread part and the outer periphery of the tip of the pilot portion is contacted with the female screw when the bolt is obliquely inserted, thereby correcting the posture of the bolt. Further, as disclosed in Patent Citation 2 and Patent Citation 3, there have been anti cross-thread bolts proposed having various kinds of threads formed on the pilot portions to enhance a posture correction effect.

As a matter of course, however, the pilot portion has a smaller diameter than the regular thread part of a bolt, and an incomplete thread part is inevitably formed between the regular thread part and the pilot portion. As a result, cross-threading may occur on the incomplete thread part. Making the pilot portion longer only reduces the obliquity of the bolt and has no specific effect in preventing cross-threading. Accordingly, making the pilot portion longer is not a good idea in terms of cost and resource.

CITATION LIST

Patent Literature

PTL 1: Japanese Unexamined Patent Publication No. 10-141343
PTL 2: Japanese Patent No. 3336257
PTL 3: International Publication No. WO2006/134626

SUMMARY OF INVENTION

According to a first aspect of the present invention, the conventional problems mentioned above are solved and provide a novel anti cross-thread bolt which prevents itself from being cross-threaded without the need for a posture correction effect provided by a pilot portion.

As a result of elaborate studies to solve the above-mentioned problems, the inventor of the present invention has found that against the conventional common knowledge, an effect of preventing occurrence of cross-threading is obtained by forming a small-diameter thread part intentionally and setting an appropriate outer diameter for the small-diameter thread part.

The present invention has been completed based on the above finding and provides a bolt which is screwed into a female screw having a nominal diameter D and an inner diameter $D_1$, wherein at the tip of a regular thread part provided on the bolt shank, a small-diameter thread part is formed by one pitch or more, the small-diameter thread part having an outer diameter d which is larger than the inner diameter $D_1$ of the female screw and smaller than $(D+D_1)/2$.

According to a second aspect of the present invention, it is preferable that the outer diameter d of the small-diameter thread part is larger than the bolt pitch diameter. In addition, according to a third aspect of the present invention, it is preferable that the small-diameter thread part is formed by one to three pitches. Furthermore, according to a fourth aspect of the present invention, at the tip of the small-diameter thread part, a pilot portion having a diameter smaller than the inner diameter $D_1$ of a female screw may be formed.

The bolt of the invention has a small-diameter thread part formed at the tip of the regular thread part by one pitch or more. The outer diameter d of the small-diameter thread part is larger than the inner diameter $D_1$ of a female screw and smaller than $(D+D_1)/2$. Therefore, even when the bolt of the invention is somewhat obliquely inserted into the female screw, the threads of the small-diameter thread part do not bite with the threads of the female screw by force and occurrence of cross-threading is prevented. This point will be described in detail later. Furthermore, as the small-diameter thread part is formed by one pitch or more no cross-threading occurs even if the bolt inclines in any direction with respect to the end of a female screw. The bolt of the invention originally does not need a pilot portion, however, a pilot portion may be formed further at the tip of the small-diameter thread part.

Hereinafter, the present invention will be described in more details with embodiments.

Figure 1:
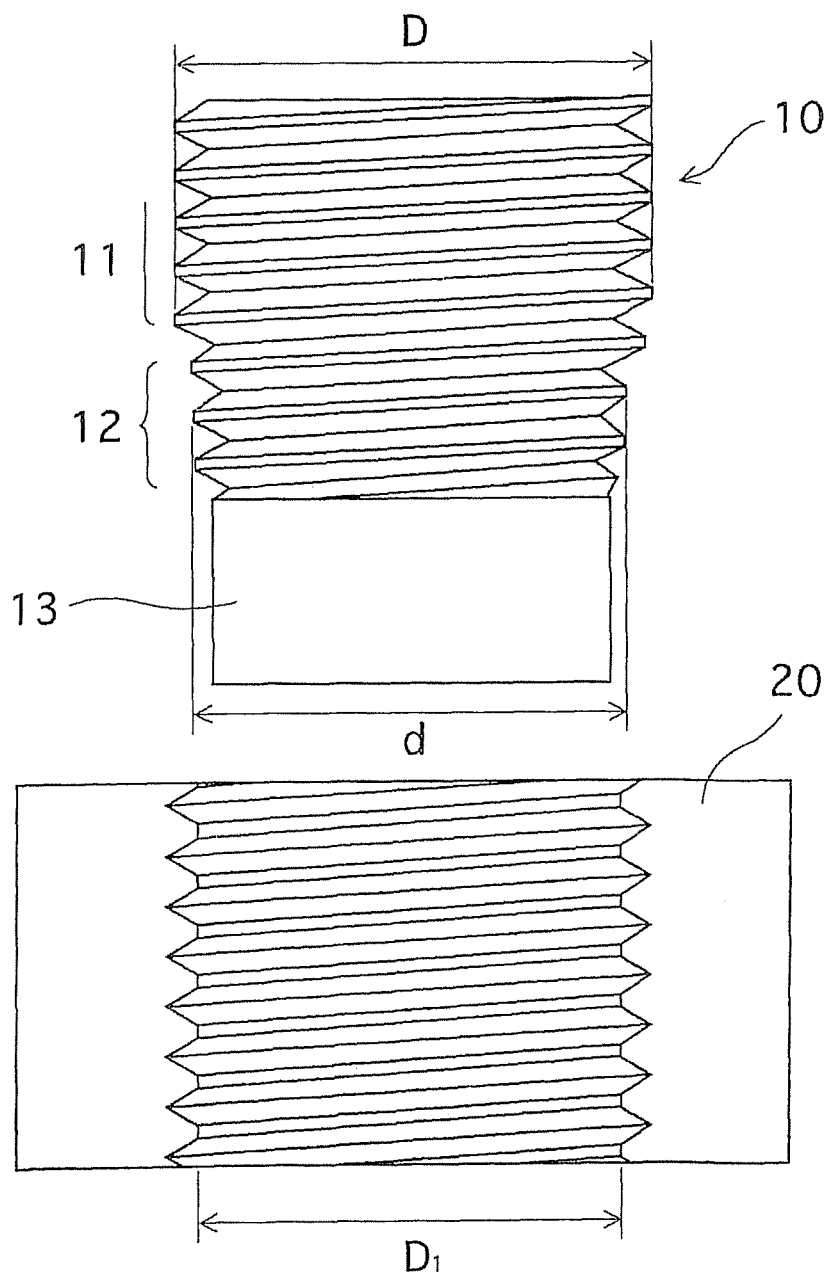
FIG. 1 is an illustrative view of the main part of the invention.

FIG. 1 is an illustrative view of the main part of the invention comprising a bolt 10 and a nut having a female screw 20 formed. The bolt 10 of the present invention is intended to be screwed into a female screw 20, which is not always limited to a nut but may be a tap hole formed on a member or the like. As is the case with a conventional bolt, the bolt 10 of the present invention has a head and a shank, which are not shown in FIG. 1, and the shank has a regular thread part 11 and a small-diameter thread part 12 consecutively formed. According to this embodiment, at the tip of the small-diameter thread part 12, a pilot portion 13 is further provided. A pilot portion 13 is not indispensable to the present invention and may be omitted.

The female screw 20 has a nominal diameter D and an inner diameter $D_1$. The nominal diameter D is common to the bolt 10 and the female screw 20. As stipulated in JIS-B0205, the nominal diameter D is the same as the outer diameter of a male screw. According to this embodiment, it is equal to the outer diameter of the regular thread part 11. In addition, as stipulated in JIS-B0205, the inner diameter $D_1$ of the female screw 20 is equal to a root diameter of a male screw. According to this embodiment, it is equal to the root diameter of the regular thread part 11. To sum up, the nominal diameter D of the bolt 10=the nominal diameter D of the female screw 20=the outer diameter of the regular thread part 11, and the inner diameter $D_1$ of the female screw 20=the root diameter of the regular thread part 11.

The above relations generally hold and are not specific to the present invention. The present invention is characterized by the small-diameter thread part 12, and in particular, that the outer diameter d of the small-diameter thread part 12 is larger than the inner diameter $D_1$ of the female screw and smaller than $(D+D_1)/2$. The small-diameter thread part 12 needs to have at least one pitch and preferably one to three pitches. Next, descriptions will be given on the reason why the outer diameter d of the small-diameter thread part 12 is set as mentioned above and on the effect produced by doing so.

Figure 2:
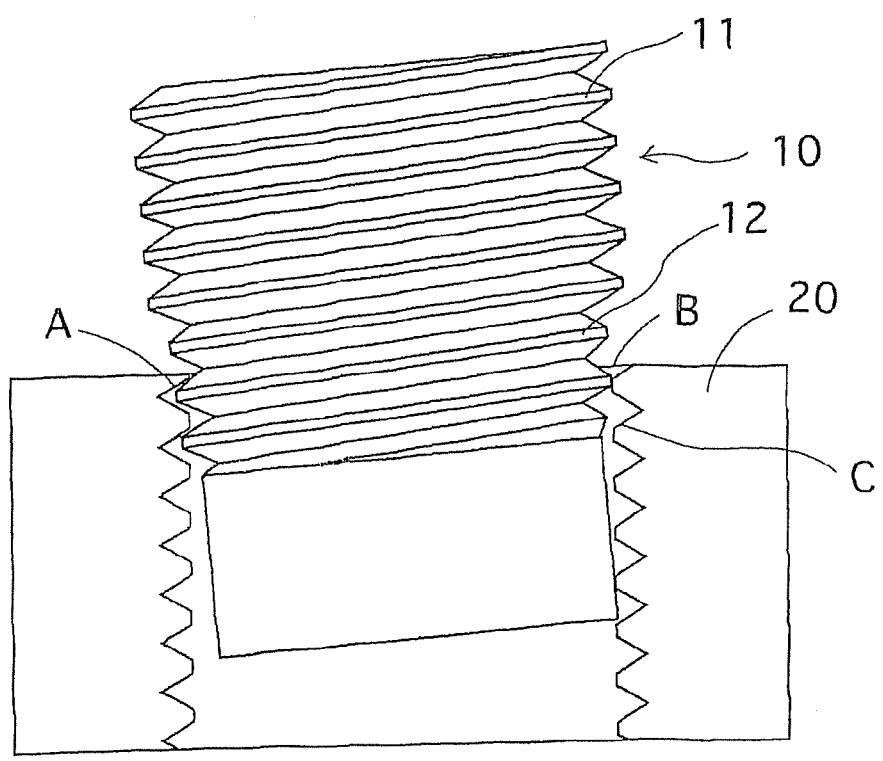
FIG. 2 is a view showing a bolt of the invention being inserted into a female screw.
Figure 4:
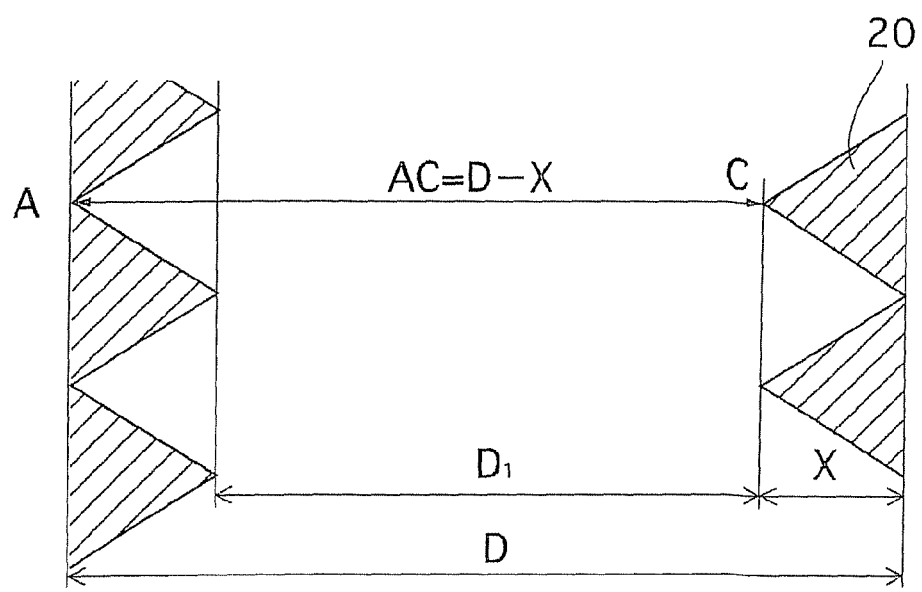
FIG. 4 is an illustrative view of dimensions.

FIG. 2 is a view showing a bolt 10 of the invention which is inserted into a female screw 20, wherein the threads of the small-diameter thread part 12 of the bolt 10 are engaged with the threads of the female screw 20 at Point A. In this state, the distance between Point A and Point B (thread head) which is located 180 degree opposite to Point A on the bolt is less than $(D+D_1)/2$ according to the present invention. On the other hand, the distance AC between Point A and Point C which is located 180 degree opposite to Point A on the female screw 20 is, as shown in FIG. 4, the value obtained by subtracting the dimension X from the nominal diameter D of the female screw 20, that is, $X=(D-D_1)/2$. Therefore, $AC=D-X=(D+D_1)/2$. In other words, since the distance between Point A and Point B on the bolt 10 is always smaller than $(D+D_1)/2$, which is the distance between Point A and Point C on the female screw 20, Point B on the bolt can turn around Point A without interference with Point C.

Figure 3:
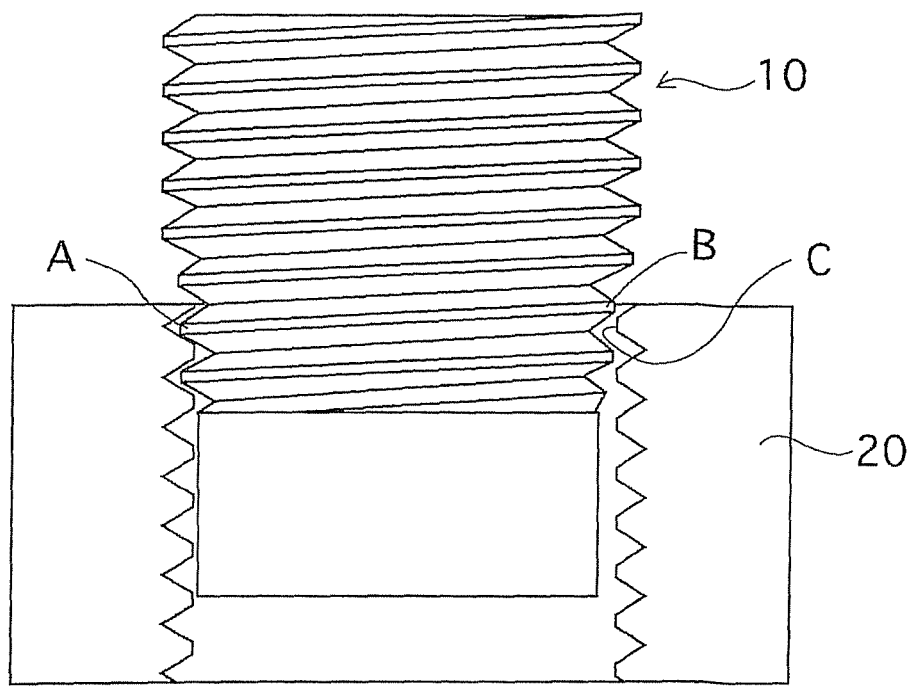
FIG. 3 is a view showing a bolt of the invention obliquely inserted into a female screw.

This allows the bolt 10 to change its inclination angle freely between the state shown in FIG. 2 and the state shown in FIG. 3. Furthermore, in the state shown in FIG. 3, the threads of the small-diameter thread part 12 are engaged with the threads of the female screw 20 only at Point A. Therefore, mutual interference of threads does not occur at other locations, and occurrence of cross-threading is prevented. Thus, by allowing a bolt to turn freely around Point A at which the bolt is first engaged, a clockwise rotation moment produced by a force applied to the bolt 10 by a screwdriver in FIG. 3 brings the bolt 10 back to a correct posture as shown in FIG. 2. By turning the bolt 10 further, the regular thread part 11 of the bolt 10 is properly screwed into the female screw 20 and fastening will be completed.

The reason why the outer diameter d of the small-diameter thread part 12 is made larger than the inner diameter $D_1$ of the female screw 20 is that if the former is smaller than the latter, the small-diameter thread part 12 may not be contacted with the female screw 20 at all, just like a pilot portion of a conventional bolt. By making the outer diameter d of the small-diameter thread part 12 larger than the inner diameter $D_1$ of the female screw 20 according to the present invention, the small-diameter thread part 12 is always brought into contact with the female screw 20 at any one point, allowing the bolt to turn around the point. In particular, it is preferable that the outer diameter d of the small-diameter thread part 12 of the bolt 10 is larger than the bolt pitch diameter. This ensures that the small-diameter thread part 12 is brought into contact with the female screw 20.

Furthermore, the small-diameter thread part 12 is formed by at least one pitch in order to ensure that the incomplete thread part 12 is always brought into contact with the female screw 20 even if the bolt 10 is inclined in any direction. In fact, however, if the small-diameter thread part is formed by just one pitch, the opposite side may not fall on the small-diameter thread part 12 depending on the contact point. Therefore, it is preferable that two or more pitches are provided. Also, after completion of fastening, the small-diameter thread part 12 does not make any contribution to fastening. Therefore, providing pitches more than necessary is meaningless. As a result, one to three pitches are preferable, and two to three pitches are more preferable. The thread shape of the small-diameter thread part 12 is not particularly limited, but as long as it meets the above-mentioned dimension rule, it may be a standard type triangular thread or trapezoidal thread. Hereinafter, an example of the present invention will be described.

EXAMPLES

Using a bolt and nut having a nominal diameter of 12 mm and a pitch of 1.25 mm, the effect of the present invention were examined. According to JIS, the nominal diameter D for this case is 12 mm on the bolt, the inner diameter $D_1$ of the female screw is 10.647 to 10.912 mm and the bolt pitch diameter is 11.188 mm. In this bolt, the small-diameter thread part is formed by two pitches at the tip of the regular thread part having an outer diameter of 12 mm. The range of the outer diameter d of the small-diameter thread part according to the present invention is 10.912 mm<d<11.32 mm, and in this example, it is 11.20 mm, which is larger than the pitch diameter.

The bolt was obliquely screwed into the nut at an angle of 4, 8 or 12 degrees and the rate of occurrence of cross-threading was measured. For comparison, using an anti cross-thread bolt having a nominal diameter of 12 mm on which a pilot portion having a shape as described in Patent Document 2 is formed, a test was conducted on the same conditions as those mentioned above to measure the rate of occurrence of cross-threading.

As a result, cross-threading occurred on the bolt for comparison with ¼ probability when it was screwed into a female screw at an inclination angle of 8 degrees, while no cross-threading occurred on the bolt of the present invention even when it was screwed into a female screw at an inclination angle of 12 degrees, resulting in normal fastening. The data obtained by this example showed that, compared to the conventional bolts, the bolt of the present invention prevents itself from being cross-threaded even when screwed into a female screw obliquely at a larger angle.

The invention claimed is:

1. An anti cross-thread bolt which is screwed into a female screw having a nominal diameter D and an inner diameter $D_1$, wherein at a tip of a regular thread part formed on a bolt shank, a small-diameter thread part having a uniform outer diameter d is formed by one pitch or more, and wherein an outer shape of a thread along the one pitch or more small-diameter thread part is the same as an outer shape of a thread in the regular thread part, the small-diameter thread part having the uniform outer diameter d which is larger than the inner diameter $D_1$ of the female screw and smaller than $(D+D_1)/2$, allowing the bolt to change its inclination angle freely, preventing mutual interference of threads at other locations, thereby preventing cross threading.

2. The anti cross-thread bolt according to claim 1, wherein the outer diameter d of the small-diameter thread part is larger than a bolt pitch diameter.

3. The anti cross-thread bolt according to claim 1, wherein the small-diameter thread part is formed by one to three pitches.

4. The anti cross-thread bolt according to claim 1, wherein a pilot portion having a diameter smaller than the inner diameter $D_1$ of the female screw is further formed at the tip of the small-diameter thread part.

5. The anti cross-thread bolt according to claim 1, wherein the thread along the one pitch or more small-diameter thread part is one of a triangular shape and a trapezoidal shape.

* * * * *